- NEUTRON FLUX PEAK
- AVERAGE NEUTRON FLUX LEVEL
- NEUTRON FLUX DISTRIBUTION CURVE
- CORE

INVENTORS
KIYOKAZU INAGAKI
HIDEMASA KATO
KIYOSHI INOUE

BY Craig, Antonelli, Stewart & Hill
ATTORNEYS

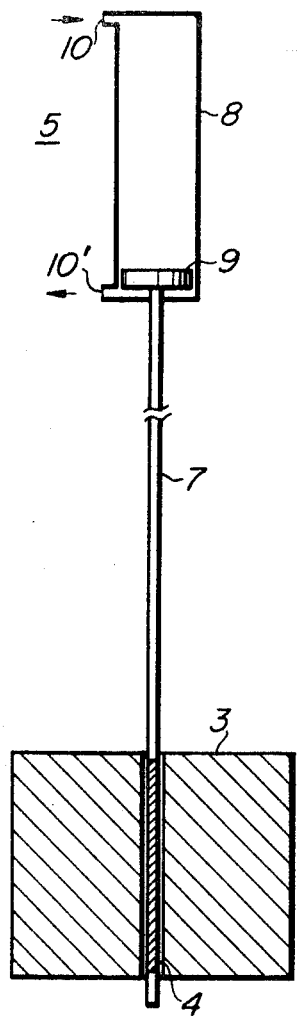
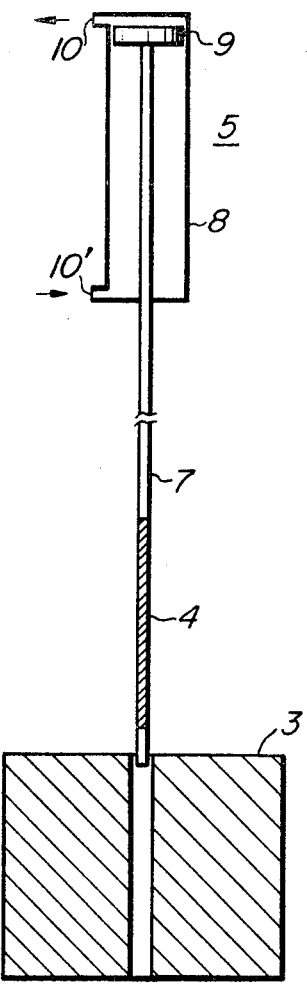

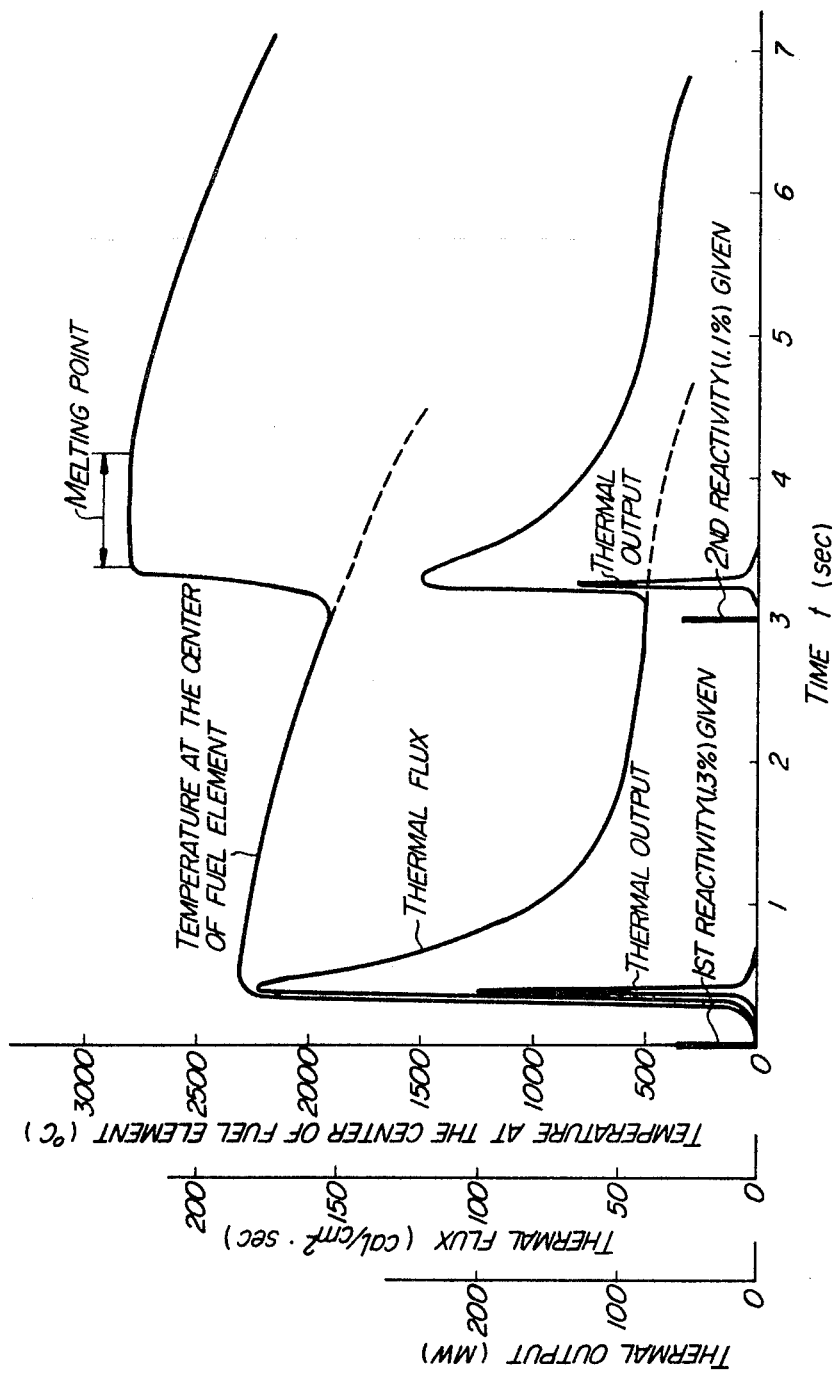

3,743,575
METHOD OF HEATING A SAMPLE MATERIAL TO A HIGH TEMPERATURE BY USING A RELATIVELY LOW POWER NUCLEAR REACTOR
Kiyokazu Inagaki and Hidemasa Kato, Sagamihara, and Kiyoshi Inoue, Tokyo, Japan, assignors to Hitachi, Ltd., Tokyo, Japan
Filed July 28, 1970, Ser. No. 58,843
Claims priority, application Japan, Aug. 1, 1969, 44/60,403
Int. Cl. G21c 17/06
U.S. Cl. 176—19 R            2 Claims

ABSTRACT OF THE DISCLOSURE

A method of heating a sample material to a high temperature by the use of a relatively low power nuclear reactor, which comprises the steps of inserting a test fuel rod including the sample material into the reactor core and repeatedly operating the reactor with relatively short repetition cycles to obtain multiple pulse outputs, said repetition cycles being set to satisfy the conditions that the thermal flux through the covering tube of the test fuel rod lowers sufficiently during each cycle, but that the temperature of the sample material hardly lowers. According to this method, a neutron bombardment test of the sample material can be effected in the state that the sample material is heated to a high temperature without fusing nor harming the covering tube or the other components of the reactor core.

BACKGROUND OF THE INVENTION

Field of the invention

This invention relates to an improvement in a method of neutron bombardment test of various materials in a high temperature utilizing a relatively low power nuclear reactor, and more particularly to a method of heating a sample material inserted into the reactor core to desired temperatures without fusing or harming the other components in the reactor core.

Description of the prior art

In order to study the change in the characteristics of materials by neutron bombardment, sample materials to be studied are often inserted into a core of a nuclear reactor. Also, widely employed is a method in which a pulsed high output state is produced for a short time in a reactor core by operating the reactor for pulse output and a high density neutron bombardment is effected during this pulsed operation.

The pulse output operation of a reactor is done by rapidly giving a large positive reactivity to the core (usually withdrawing a control rod rapidly). Namely, when a large reactivity in a step form is given to the core, the reactor output rapidly increases at first, but it begins to lower after some interval, thus producing a short pulse output. This arises from the fact that the fuel temperature increases with the increase in reactor output while the reactivity is suppressed by the known Doppler and Void effects. When the reactor output lowers and accordingly the fuel temperature lowers, the suppression effect (self-control effect) of the reactivity described above becomes weak. Now, when the above reactivity is maintained (namely, the control rod is held withdrawn), the reactor output increases again, so that, for the sake of safety, after one pulse output operation either the above reactivity is removed (namely, the control rod is inserted again into the core) or another large negative reactivity is given (namely, another control rod is inserted deeply into the core) to stop the operation of the reactor.

According to such a pulsed operation, a high instantaneous peak thermal output of about several hundred mw. can be produced sufficiently safely even in a low output power nuclear reactor of a rated capacity of about 100 kw. Thus, the above method makes it possible to perform a neutron bombardment test of a sample material at a high temperature and with a high neutron flux density.

For example, when a melting test of a sample material is desired, the sample material must be heated to the melting point thereof. In the pulsed operation described above, the temperature produced in the core becomes higher as the reactivity given to the core is made larger, but when the core temperature becomes high, the material in the core except for the sample material (such as the fuel rod or other components) may be fused or harmed. For example, when the melting test of a $UO_2$ pellet is to be done in the reactor core, the required temperature is as high as about 2800° C. At this temperature, the other fuel rods may also be fused. The term "melting test" used in this specification implies a neutron bombardment test of a sample material at or around the melting point of the sample material.

In the conventional method, the fuel rod and the moderator are arranged so that only the fuel rod comprising the test material (hereinafter referred to as the test fuel rod) may be heated to a high temperature and the other fuel rods or components may not be heated to so high a temperature to avoid the damage of the fuel rods or components other than the test fuel rod. Even in this method, the problem remains as to the damage of the test fuel rod itself. For example, when a thermal output sufficient to fuse the $UO_2$ pellet inserted into the test fuel rod is produced by one-cycle pulse output operation, the thermal flux through the covering tube (made for example of stainless steel) of the test fuel rod may exceed the safety limit to damage the covering tube and the radioactive materials inside thereof may be dispersed in the core.

Thus, the conventional method sets a limitation to the temperature to be given to a sample material in the test fuel rod without harming the covering tube, and thus a melting test of refractory or high melting point materials such as $UO_2$ or tungsten pellets has been practically impossible.

SUMMARY OF THE INVENTION

An object of this invention is to provide a method of heating a test material to a required high temperature without fusing or harming a covering tube sealing the test material or the other components in a reactor core and performing a high density neutron bombardment test on the test material.

In order to achieve the above object, a pulsed operation of the reactor is effected repetitively with a predetermined time interval to increase the temperature of the test material in the core and to suppress the thermal flux through the covering tube sealing the test material within a limit or critical value. Namely, in this invention, the second pulsed operation is effected under such a state after the first pulse operation cycle that the thermal flux through the covering tube sealing the test material lowers sufficiently, but the temperature of the test material does not lower yet. Thus, the temperature increase in the test material is superimposed and only the test material is heated to a required high temperature while the thermal flux through the covering tube is maintained below the critical value.

BRIEF DESCRIPTION OF THE DRAWING

FIGS. 3a and 3b and FIGS. 4a, 4b and 4c are diagrams explaining the operation of a reactor control mechanism for performing this invention.

FIG. 7 is a diagram showing time variations in the thermal output of the reactor, the temperature of the center of the test fuel rod and the thermal flux through the fuel covering tube when this invention is performed.

DESCRIPTION OF THE PREFERRED EMBODIMENTS

Figure 1:
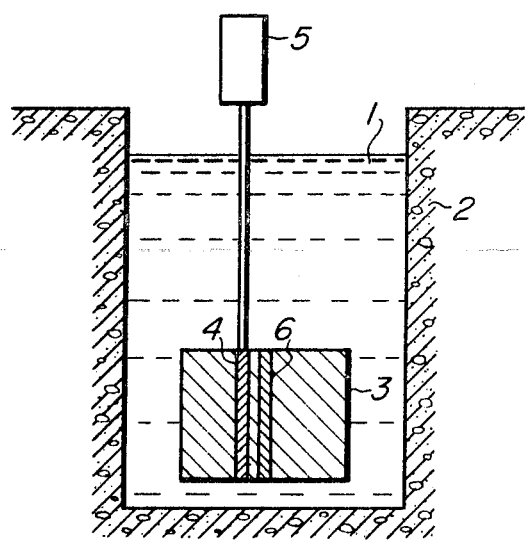
FIG. 1 is a longitudinal sectional diagram showing a schematic construction of a swimming pool type nuclear reactor suitable for performing the method of this invention.

FIG. 1 shows a schematic construction of a swimming pool type nuclear reactor for neutron bombardment suitable for a pulsed operation, in which numeral 1 designates a coolant pool, 2 designates a concrete shielding wall, 3 designates a reactor core, 4 indicates a pulse control rod, 5 indicates a driving mechanism for the control rod, and 6 designates a test fuel rod sealing a test sample material.

Figure 5:
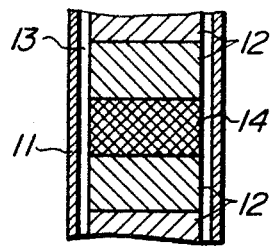
FIGS. 5 and 6 are fragmentary longitudinal sectional diagrams showing an example of the structure of a test fuel rod into which a test material is inserted.
Figure 6:
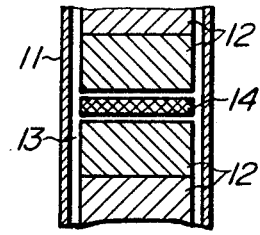

The test fuel rod 6 may be a rod which is formed by placing a test sample material 14 between fuel pellets 12 contained in a covering tube 11 as shown in FIG. 5 and wherein a gas such as helium gas is contained in a gap 13 provided between these and the covering tube 11, or a rod in which another helium gap is provided between the fuel pellet 12 and the test material 14 as shown in FIG. 6 to reduce the thermal dissipation from the test material. The test material 14 may be a fuel element such as $UO_2$ pellets or a refractory metal such as tungsten, but the following description refers to the $UO_2$ pellets as a test material and the case of melting test thereof will be explained.

In the core 3 described above, the amount of moderator (light water) is made larger at a particular point near the center of the core than at any other place by suitably selecting the arrangement of fuel rods, by which the rate of neutron absorption by the fuel element becomes smaller at the above particular point than at any other place to increase neutron flux density at that point.

Figure 2:
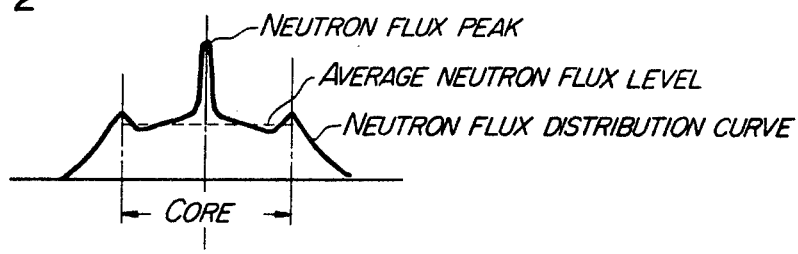
FIG. 2 is a diagram showing an example of the neutron flux distribution in the core of the nuclear reactor shown in FIG. 1.

FIG. 2 shows an example of the neutron flux distribution obtained in this way, in which a neutron flux peak of factor 2.5 compared with the average neutron flux level is formed at the center of the core. Now, by inserting a test fuel rod into the position of the neutron flux peak, a higher density neutron bombardment can be effected at a higher temperature at the center position than at other positions.

The pulse output operation of the reactor is carried out by rapidly moving the pulse control rod 4 with the control rod driving mechanism 5 and giving a step form of large positive reactivity to the core. FIGS. 3a and 3b show an example of the control mechanism for the pulsed operation, in which the pulse control rod 4 consisting of a neutron absorber is connected through a control lever 7 to a piston 9 moving in a cylinder 8 and the control rod 4 is moved in and out of the core 3 by moving the piston 9 with compressed air. Namely, when compressed air is sent from an upper inlet 10 of the cylinder 8, the control rod 4 is inserted into the core as shown in FIG. 3a, and the reactor stops in this state. When compressed air is sent from a lower inlet 10' on the contrary, the control rod 4 is withdrawn to a position as shown in FIG. 3b and a positive reactivity is given to the core.

The above description refers to the case where the pulse control rod 4 is made of a neutron absorber, but the control rod 4 may be formed by a fission material (such as fuel element) which gives a positive reactivity when it is inserted into the core.

This invention includes either case, but the case where the control rod 4 is formed of a neutron absorber will be described below.

In the reactor as described above, when the pulse control rod 4 inserted into the core is pulled out in about 0.2 second to give an excess reactivity of 1.3% to the core, there are obtained time variations of the central temperature of the test fuel element ($UO_2$ pellet) contained in the test fuel rod 6 inserted into the position where the neutron flux density is about 2.5 times the average neutron flux level, of the thermal flux across the covering tube and of the thermal output power as shown in FIG. 7. It is seem from the figure that the thermal output has a sharp pulse waveform and the peak value is about 200 mw. The peak value of the central temperature of the test fuel rod is about 2300° C. and the peak value of the thermal flux 180 cal./cm.$^2$·sec. Now, since the melting point of the test fuel element ($UO_2$ pellet) is about 2800° C., it is impossible to perform a melting test of the test fuel element under such conditions.

If the reactivity given to the core is made larger, it is possible to make the peak value of thermal output larger and to enhance the central temperature of the test fuel element. However, if the reactivity is made too large, the thermal flux through the covering tube exceeds the critical value and the covering tube may be damaged. According to the experiment, the upper limit (safety limit) of thermal flux for avoiding the breakdown of the covering tube made of stainless steel is about 200 cal./cm.$^2$·sec. When the central temperature of the test fuel element is to be raised to 2800° C. by single pulsed output operation with a larger reactivity, the peak value of the thermal flux through the covering tube becomes about 230 cal./cm.$^2$·sec. and far exceeds the critical value (200 cal./cm.$^2$·sec.) described above.

Thus, according to the conventional method of one pulsed operation, it has been difficult to fuse the test fuel element in the covering tube without harming the covering tube.

According to this invention, the pulsed output operation is repeated with short time intervals. Thus, it becomes possible to raise the temperature of the test fuel element to a value unachievable by the conventional method easily and safely without increasing the thermal flux through the covering tube above the critical value.

The temperature distribution in the test fuel element after one pulsed operation is such that the temperature is higher at the periphery and lower at the center just after the reactivity is given, but the temperature at the center gradually rises relatively and the temperature at the periphery relatively lowers because of the low thermal conducitvity of the fuel element. According to the experiment, the temperatures at the center and at the periphery become nearly equal in about 0.4 second after the reactivity is given. Then the temperature becomes higher at the center and lower at the periphery, namely the temperature distribution is cone-shaped. In the cone-shaped temperature distribution state, the difference between the temperatures at the center and at the periphery amounts to about 1000° C. at maximum. Thus, though the temperature at the center of the fuel element hardly lowers, the temperature at the periphery rapidly lowers. Accordingly, the thermal flux through the covering tube rapidly lowers together with the peripheral temperature.

In an example shown in FIG. 7, the temperature at the center of the test fuel element is still 1900 C. about three seconds after the first reactivity is given, while the thermal flux through the covering tube is already reduced to 40 cal./cm.$^2$·sec.

In the conventional method, the reactor is stopped for a sufficiently long time for safety after one pulsed operation, the central temperature of the fuel element is lowered sufficiently, and only then the next pulsed operation is performed when required. However, according to the above consideration, it is not necessary to stop the reactor as long as the thermal flux through the covering tube is kept sufficiently small.

According to this invention, the subsequent pulsed operation is performed when the thermal flux through the covering tube sufficiently lowers after the first pulsed operation, but before the temperature at the center of the test fuel element does not lower too much. Thus, the thermal flux through the covering tube is always suppressed within a critical value while the temperature increase of the test fuel element is superposed.

For example, when a reactivity of 1.3% is given at first and a reactivity of 1.1% is given after three seconds as shown in FIG. 7, the temperature at the center of the fuel element and the thermal flux through the covering tube increase again at 1900° C. and 40 cal./cm.$^2$·sec, respectively. (When the second reactivity is not given, they continue to lower as shown by the broken lines.)

After the second reactivity is given, the peak thermal output becomes about 130 mw., the peak value of the temperature at the center of the test fuel element becomes 2800° C., and the full element begins to fuse. If the test fuel element does not fuse, the temperature at the center of the fuel element rises to 3200° C. The peak value of the thermal flux through the covering tube is 120 cal./cm.$^2$·sec. in this state, which is sufficiently lower than the critical value of 200 cal./cm.$^2$·sec. and the covering tube is safe from damage.

Thus, according to this invention, the pulsed output operation of the reactor is repeated with relatively short time intervals under the condition that the thermal flux through the covering tube may not exceed the critical value. Thereby the temperature increase of the test fuel element is superposed and the test fuel element is heated to a desired high temperature without harming the covering tube.

It is preferable for producing a desired high temperature to make the reactivity as large as possible within the range where the thermal flux through the covering tube does not exceed the critical value, but it is also possible to obtain a required high temperature by the thermal accumulation effect of the test fuel element if the repetition rate of the pulsed operations of the core is increased when the reactivity to be given is small. Namely, the number of pulsed operations in this invention is not limited to two, but more than two repeated cycles are allowed.

The thermal accumulation effect of the test fuel element becomes more effective if the thermal radiation from the test fuel element is made smaller by, for example, increasing the gap between the test fuel element and the covering tube and thus the thermal flux through the covering tube is reduced. FIG. 6 shows an example of such a fuel rod structure.

Though the above description referring to the case where a $UO_2$ pellet is used as test material and the melting test thereof is performed, other solid materials (for example, refractory metal such as tungsten, ceramics, etc.) may naturally be used as the test material. In any case, this invention makes it possible to heat the test material to a high temperature unachievable up to now.

Figure 4A:
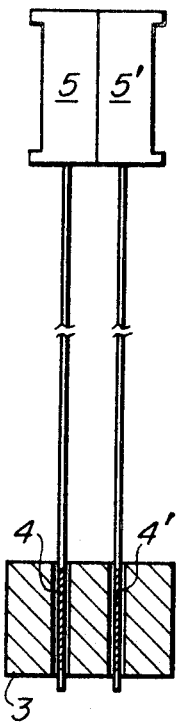
Figure 4B:
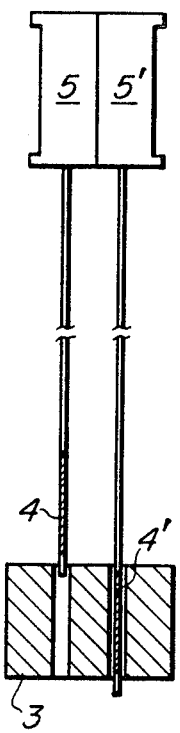
Figure 4C:
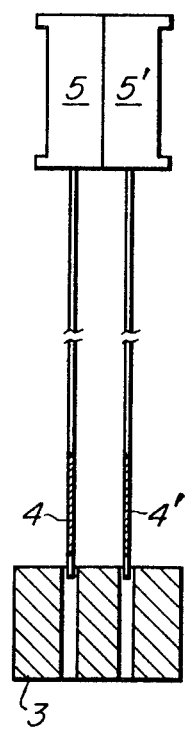

In order to perform a pulsed output operation of a reactor repeatedly, it is necessary to give a reactivity repeatedly in a step form with a short time interval. This process is performed as follows. Namely, the single pulse control rod 4 is pulled out of and pushed into the core 3 repeatedly with the control mechanism as shown in FIGS. 3a and 3b, or the plurality of pulse control rods 4 and 4' are subsequently pulled out of the core 3 with separate driving mechanisms 5 and 5' as shown in FIGS. 4a, 4b and 4c, thus giving a plurality of step reactivities. Further, needless to mention, it is possible to compose the pulse control rod of a fission material instead of a neutron absorber. In this case, a positive reactivity is given when the rod is inserted into the core.

Figure 8:
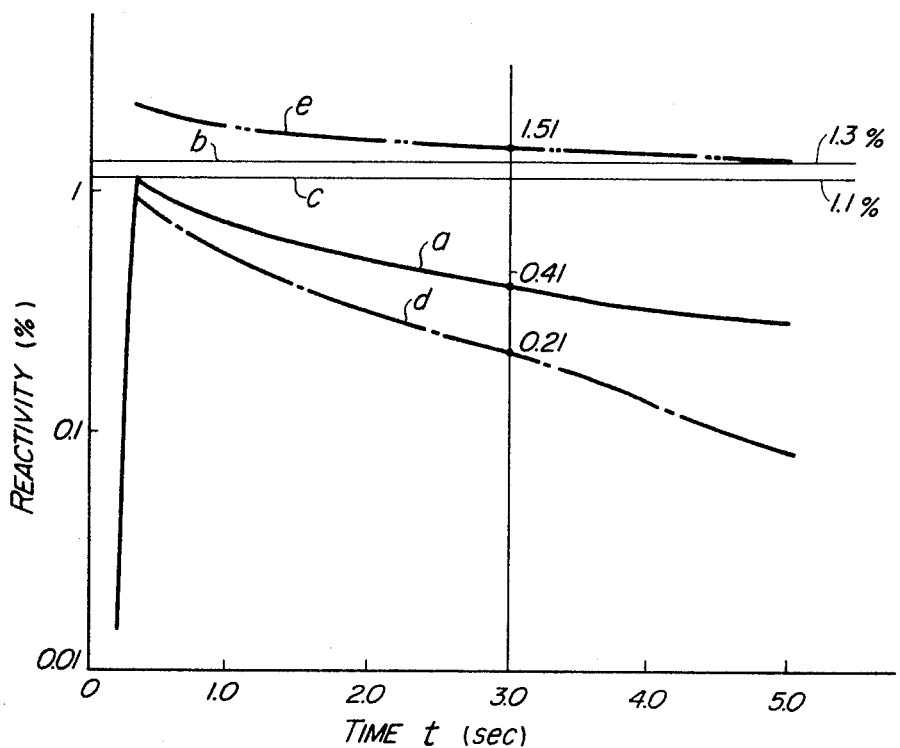
FIG. 8 is a diagram showing the relation between the reactivities and time according to this invention.

When the reactivity is given for the second time, it is necessary to take into account the feedback reactivity of the core. In the example described above, the first reactivity is 1.3% and the feedback reactivity after three seconds is —0.41%. Accordingly, if the first reactivity of 1.3% is retained, the reactivity of the core becomes 1.3—0.41=0.89% after three seconds. In the case, the reactivity of 1.1—0.89=0.21% which is the shortage of reactivity is sufficient as the reactivity given for the second time. When the reactivity of 1.3% given for the first time is eliminated at the time of giving the second reactivity, the reactivity in the core becomes —0.41% and the reactivity to be given for the second time becomes 1.1+0.41=1.51% (or 1.3+0.21=1.51%). FIG. 8 shows such a relationship, wherein the abscissa indicates the time after the first reactivity is given and the ordinate indicates the reactivity in a logarithmic scale. In the figure, the curve $a$ shows a (negative) feedback reactivity, the line $b$ indicates the level of a first reactivity (1.3%), the line $c$ indicates the reactivity (1.1%) to be given for the second time, the curve $d$ indicates the reactivity to be given for the second time when the first reactivity (1.3%) is not eliminated, and the curve $e$ indicates the reactivity to be given for the second time when the first reactivity is already eliminated.

As has become apparent from the foregoing detailed description, the temperature increase of the test material inserted into the predetermined position of the core is superposed in this invention by repeating the pulsed output operation of the reactor and thus only the test material is heated to a required high temperature without harming the covering tube containing the test material or other components in the reactor core. Thus, this invention is particularly suitable when the melting test of a material is to be effected with a low output nuclear reactor.

We claim:
1. A method of heating a test material to a high temperature under a condition that a thermal flux through a covering tube of a test fuel rod in which a test material and fuel elements are sealed does not exceed a critical value, which comprises the steps of inserting the test fuel rod into a core of a nuclear reactor capable of a pulsed output operation and repeating the pulsed output operation of said reactor with a predetermined time interval, said time interval being determined so that the thermal flux through the covering tube of said test fuel rod sufficiently lowers during said time interval, but that the temperature of said test material hardly lowers during said time interval.

2. A method of heating a test material according to claim 1, wherein the fuel rod containing said test material is inserted into a position where the neutron flux density assumes a maximum peak value.

References Cited
UNITED STATES PATENTS
2,768,134   10/1956   Fermi et al. _____ 176—19 R FOREIGN PATENTS
1,368,393   2/1963   France _____ 176—19 R REUBEN EPSTEIN, Primary Examiner U.S. Cl. X.R.
250—106 S